United States Patent [19]
Redmond

[11] Patent Number: 6,085,942
[45] Date of Patent: Jul. 11, 2000

[54] COFFEE CREAMER AND OTHER CUPS AND TUBS

[76] Inventor: Sanford Redmond, 746 Riverbank Rd., Stamford, Conn. 06903

[21] Appl. No.: 08/794,554

[22] Filed: Jan. 31, 1997

Related U.S. Application Data

[60] Provisional application No. 60/011,043, Feb. 2, 1996, and provisional application No. 60/034,633, Jan. 3, 1997.

[51] Int. Cl.[7] .................................................. B65D 37/00
[52] U.S. Cl. ..................... 222/107; 222/541.6; 222/564; 206/469; 206/484; 206/820; 206/824
[58] Field of Search ........................ 222/107, 212, 222/541.6, 547, 564; 206/469, 484, 820, 824

[56] References Cited

U.S. PATENT DOCUMENTS

| | | | |
|---|---|---|---|
| 1,438,487 | 12/1922 | Greene | 222/107 |
| 2,705,579 | 4/1955 | Mason | 222/107 |
| 2,898,003 | 8/1959 | Wilson et al. | 222/107 |
| 2,956,710 | 10/1960 | O'Connor | 222/107 |
| 2,962,192 | 11/1960 | Volckening | 222/107 |
| 3,083,876 | 4/1963 | Schneider et al. | 222/107 |
| 4,493,574 | 1/1985 | Redmond et al. | 222/107 |
| 4,611,715 | 9/1986 | Redmond | 206/484 |
| 4,921,137 | 5/1990 | Heijenga | 222/107 |
| 5,395,031 | 3/1995 | Redmond | 222/107 |
| 5,411,178 | 5/1995 | Roders et al. | 222/107 |
| 5,529,224 | 6/1996 | Chan et al. | 222/212 |
| 5,839,609 | 11/1998 | Zakensberg | 222/107 |

*Primary Examiner*—J. Casimer Jacyna
*Attorney, Agent, or Firm*—Morgan & Finnegan, L.L.P.

[57] ABSTRACT

A container thermoformed from a relatively thin flat plastic film comprising an upright standing hollow containment formation having an upper flat rim to which a thin cover member is sealingly attached in a sealing pattern. The sealing rim encompassing the containment formation with at least a portion of the sealing rim extending outwardly from the hollow containment formation an amount adequate to permit it to function as a tab. The extending tab portion has a fault line on its underside traversing the tab at a right angle to a centerline extending outwardly from the hollow containment formation which when the tab portion is upwardly bent causes the tab to rupture at the fault line. The rupturing causes the outer tab portion to break away from the remaining tab portion while remaining sealed to the thin cover member which is also upwardly bent to create an outlet passage for flowable material between the remaining tab portion and the thin cover.

21 Claims, 8 Drawing Sheets

COFFEE CREAMER AND OTHER CUPS AND TUBS

This application claims the benefit of U.S. Provisional Application Ser. No. 60/011,043, filed Feb. 2, 1996, and U.S. Provisional Application Ser. No. 60/034,633, entitled "IMPROVED COFFEE CREAMER AND OTHER CUPS AND TUBS," filed Jan. 3, 1997 in the name of the Applicant of the instant application, both of which are herein incorporated by reference.

FIELD OF INVENTION

This invention relates to easy opening, self-contained, easy to use unit-of-use dispenser packages capable of economical, high speed production, manufactured from a broad range of materials, many of which are recyclable. They may contain such products as syrups, creams, cheeses, salad dressings, shampoo, hand-cream, liquid detergents, oil, toothpaste, pates, pet food, antacids, medications, glues and many other food, non-food, medical and industrial products. It additionally relates to a package which has the capability of dispensing the contained product, e.g. mouthwash, cough syrup, confections, alcoholic beverages, etc. directly into the mouth of the user.

BACKGROUND OF THE INVENTION

The liquid coffee creamer is one of the most widely used unit of use packages in the world, the US alone using some 15 billion annually. It is also probably one of the most poorly conceived and designed for its purpose, a little thin walled flexible plastic bucket generally made of high impact polystyrene (HIPS) with a peel-off lid. Its purpose being to safely contain cream up to the point of use, be readily opened by the user, deliver the cream to the coffee and finally to be set safely down. To use it the end user must have the manual dexterity to do so, but who may be aged, infirm, arthritic, not dexterous or just not paying full attention to this annoying little task. It must finally be poured into the awaiting coffee, not so easy in a moving vehicle, train or plane etc. and finally set down. As is evident, the product contained whether actual cream or some man-made whitening agent is of relatively low viscosity. Both hands are needed to open the little flexible bucket which has a peel-off lid.

This operation, which requires that the bucket be held firmly by squeezing it, can cause inadvertent spilling or squirting of the low viscosity cream product, unfortunately, on the user as often as not. Assuming this peeling operation is successfully accomplished. the cream must be poured into the coffee and then set down. These little buckets often have small bases and invariably contain unused cream. They are easily knocked over, again spilling the product on the table, tray or user.

They have a further disadvantage in that the expensive peel-off lid is usually made of a foil-plastic combination. It is rarely ever completely peeled off. Should recycling become necessary each of these lids which are not recyclable, would have to be peeled from each creamer manually.

As noted above, in order to peel back the lid the little bucket most be firmly grasped. To grasp the lid firmly, the bucket and particularly its rim must have structural integrity and strength. This is accomplished by using thick material on the order of 20–27.5 mils of high impact polystyrene (HIPS). The lid must also have strength to peel it away. In most cases a foil/polyester/peelable adhesive lamination is used. This thin little combination often represents one third to one half the material cost of the package.

In this highly competitive field of large volume unit-of-use packaging there are 5 factors which affect the success of any given unit. They are: 1. Cost; 2. Ease of use; 3. Resistance to accidental opening or spilling; 4. Appearance; and 5. Environmental impact.

As previously mentioned, one of the most visible forms of this unit packaging is the coffee creamer. This little bucket shaped package with its tab operated peel-off lid and massive sales volume (15 to 20 billion annually in the U.S.A. alone) is relatively expensive, difficult to use, prone to accidental spilling and has a negative environmental impact and a neutral appearance. It fails four of the five criteria for success but, as the saying goes, it's the only kid on the block.

One purpose of this invention is to overcome these severe shortcomings and make it less expensive, easy to use, spill resistant and environmentally improved. While its appearance will still remain neutral, users may look on it with pleasure since its so user friendly and spill resistant.

Peeling the lid off requires a surprising amount of force and to resist such force on the order of 21 mils of thermoformable plastic (HIPS) film stock is generally required for the lower pocket member, particularly its rim, while a tough plastic-foil plus a layer of strong but peelable adhesive is required for the peel-off lid. Needless to say the plastic container formation has to also resist squeezing while the lid is peeled off or the product will squirt out of the cup.

With approximately 50 billion creamers annually sold worldwide one can imagine the capital investment that would have to be made to displace existing production equipment. The German made Robert Bosch aseptic creamer machine which sells for some $2,000,000 produces 80,000 units per hour. Aseptic creamers are desirable in many parts of the world and are even used in the U.S.A. even though our domestic refrigeration systems and refrigerated delivery ability are far superior to those in all countries outside the U.S.A. Displacement of these existing machines would likely be very difficult, very costly and therefore resisted since that cost has to be factored into the selling price of the creamers.

OBJECTS OF THE INVENTION

In light of the foregoing problems and disadvantages in the field of dispenser packages, the following are objects of the present invention:

To replace difficult to use peel-off lid coffee creamers and other unit of use tubs with easy to open, spill resistant dispenser packages of similar configuration;

To make such dispenser packages on currently used equipment with simple, relatively inexpensive modifications;

To make units that will open by simply bending a tab upward to create an outlet;

To make units that will controllably dispense product when squeezed;

To reduce the total amount of plastic used per unit;

To make such units fully recyclable;

To eliminate costly peel-off lids and replace them with very low cost monolayer plastic;

To enable such units to be readily opened even though made of tough non-frangible materials;

To make such units which can dispense products by simply applying finger pressure to said units;

To make such units which can dispense such products in a ridged ribbon;

To eliminate unrecyclable garbage;

To reduce the unit cost of such packages by reducing the base film thickness; and To make units which can function both as a peel-lid cup or an easy opening outlet.

SUMMARY OF INVENTION

The unexpected discovery of this application, that outlet creating means utilizing a variety of methods and/or structures including variations on those disclosed in Applicant's U.S. Pat. Nos. 5,395,031; 4,493,574; 4,611,715; etc., could be integrated into the widely used bucket shaped creamer described above yields many significant benefits. The subject outlet creating means may be generally described as a means embodied in the tab portion of the upper rim of the bucket which create an outlet passage which extends from the bucket to the outside and which has a fault line traversing it on its underside. To open this outlet passage to the outside the tab is simply bent up, fracturing the fault line to create it. It will be seen that by creating an outlet passage in the package through which the product may be dispensed by gently squeezing it we can, in one stroke, eliminate the costly foil/plastic/adhesive peel off lid and replace it with sealed on lid of 1 or 2 mils of a like material from which the bucket was made e.g. HIPS. This lid may then be heat sealed directly to the bucket eliminating the need for an adhesive or sealant layer.

Since the lid isn't peeled off there's no requirement for structural strength to resist such peeling. It is particularly important that as the gauge thickness of the thermoformable film stock is reduced that this function be used to advantage by careful design, since it will be noted that with the elimination of the lid peeling function the requirement for rim strength is so significantly reduced that HIPS of 6 to 10 mils thickness may be utilized.

A further benefit is that the creamer of this invention may be made by a simple modification of the current widely used standard creamer package in most cases accomplished by a simple relatively inexpensive addition to and/or modification of much of the equipment, aseptic or not, presently used to produce standard creamers. This is of major significance.

The concepts introduced herein beneficially deal with each and every drawback of the present bucket shaped creamers. The thinner gauge film stock which can be used plus the elimination of the foil/plastic/adhesive lid reduces cost by a factor of at least 50% and further creates significant (50%) source reduction of plastic materials and the elimination of lid garbage. Accidental spilling or squirting are virtually eliminated.

It will be further be seen that the reasons for the huge benefits to the bucket shaped creamer design that adding outlet creating means bring, also apply and may be transferred to the familiar rectangular cups or tubs with a peeling tab located at one corner of the package. In particular tubs with a relatively narrow sealing rim encompassing the rectangular product pocket formation with one of its corners flatted so that a roughly triangular tab is developed at that corner. It is within this rim extension that the various versions of outlet creating means mentioned herein would be located.

BRIEF DESCRIPTION OF THE DRAWINGS

FIG. 1a top plan view of the container of FIG. 1;

FIG. 1d is a sectional view take along line A—A of FIG. 1a;

FIG. 15b is a side plan view of the container of FIG. 15a;

DETAILED DESCRIPTION OF THE PREFERRED EMBODIMENTS

Figure 1:
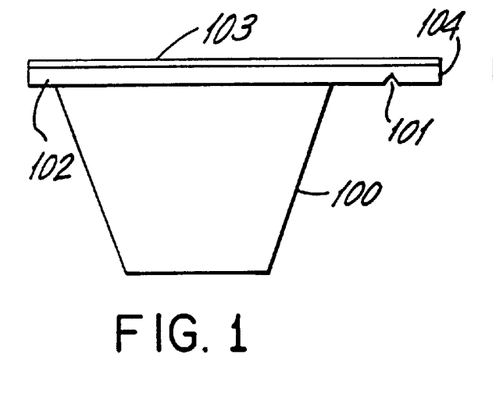
FIG. 1 is a side plan view of a container according to one embodiment of the present invention.

Turning to FIG. 1 we have a side plan view of the first embodiment of the present invention showing a generally frusto-conical bucket shaped dispensing container 100 made of a frangible plastic (HIPS) with a containment formation in which coffee cream or other low viscosity product is held. The container 100 has a flat rim 102 encircling said containment formation a portion of which extends outward from said containment formation, to form a tab 104. Also shown on the underside of said tab 104 is a fault line 101. Sealed to the top surface of said rim and tab 104 is a thin plastic membrane like lid 103.

Figure 1A:
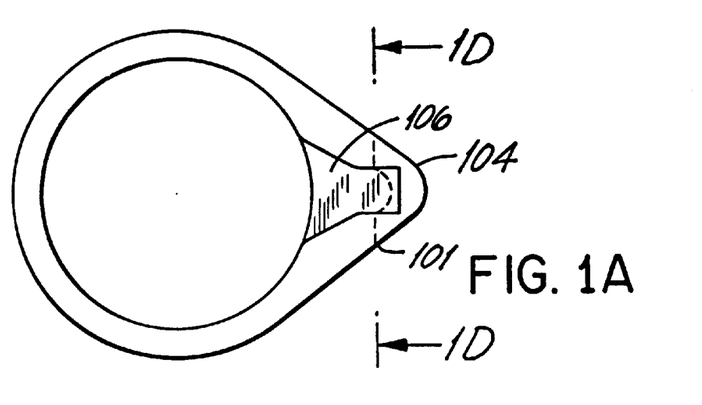

Turning to FIG. 1a we have a top plan view of the container 100 showing a tongue shaped unsealed area 106 indicated by cross hatching between said lid 103 and said rim 102 and tab 104 where the unsealed area 106 crosses over and slightly beyond the fault line traversed the underside of the tab. It also indicates a section A—A through the fault line which is shown in FIG. 1D. showing a central unsealed area 106 between two sealed areas indicated by small x's.

Figure 1B:
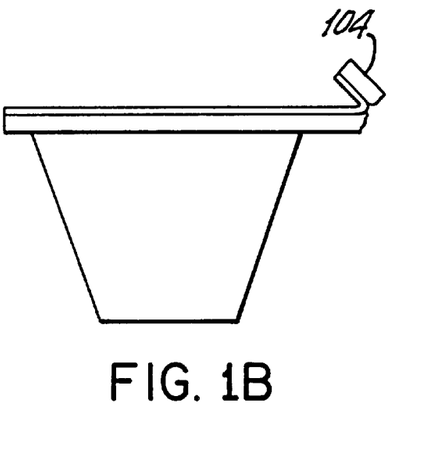
FIG. 1b the side plan view of the container of FIG. 1 showing a ruptured fault line.

FIG. 1B shows a side plan view of the dispensing container with the tab 109 bent back rupturing the fault line ready to dispense the product.

Figure 1C:
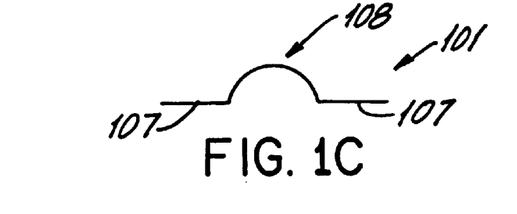
FIG. 1c is an enlarged outline of a fault line of the container of FIG. 1.
Figure 1D:
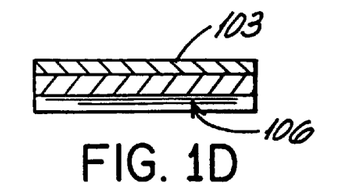
Figure 1E:
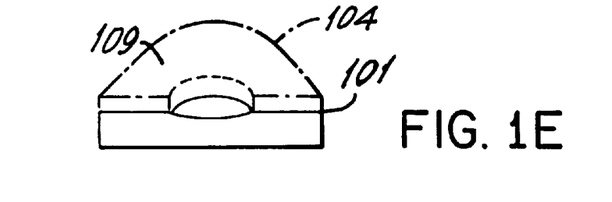
FIG. 1e is an enlarged sectional view take along the fault line of the container of FIG. 1.

FIG. 1C indicates the fault line configuration having a straight section 107 at each end and a curved arcuate section 108 between said straight sections 107. FIG. 1E shows the cross section of the outlet created with the tab 104 bent back showing the arc 109 created by the rupturing of the arcuate section 108 of the fault line 101.

In the instant invention, by eliminating the need to peel the lid off, cost savings on the order of over 50% are achieved since the package needs minimal rigidity. The film from which the product containing member or bucket may be made of may be on the order of 10 mils thick and the lid may be a simple monolayer of 1 to 2 mils HIPS with no additional layer required. An outer coating of Saran (PvDc) might in some cases be desirable and may be applied during the printing process and add very slightly to the cost of the lid.

In this application packages made of frangible plastic films such as HIPS don't require stress concentrating protrusions to cause a fault line to rupture thus the terms, groove and micro-groove, are used to describe these formations even though they may protrude on the fault line side of the tab extension. It will also be understood that a somewhat deeper channel can be made with a protrusion projecting from the underside of the tab but it may leak if low viscosity liquid is contained and it's accidentally tipped over.

Figure 2:
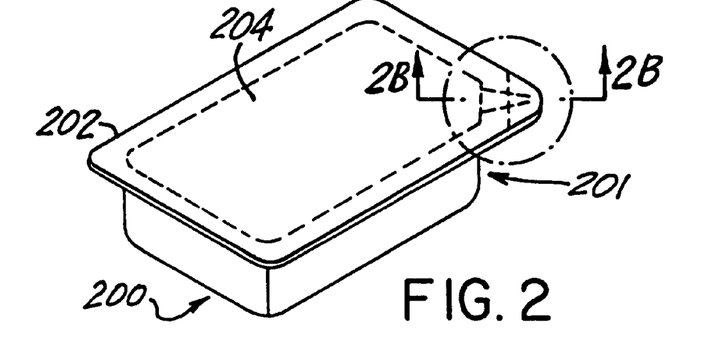
FIG. 2 is a partially elevated perspective view of a container according to another embodiment of the present invention.
Figure 2A:
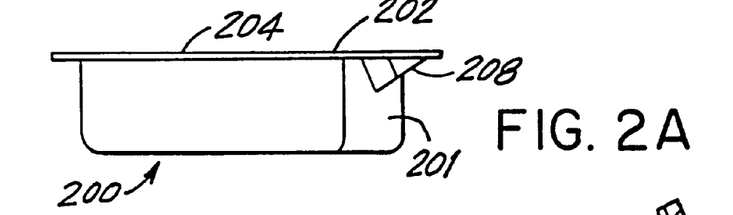
FIG. 2a is a side perspective view of the container of FIG. 2.
Figure 2B:
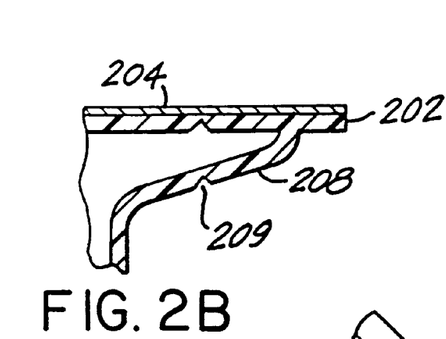
FIG. 2b is an enlarged sectional view taken along line 2b—2b of FIG. 2.
Figure 2C:
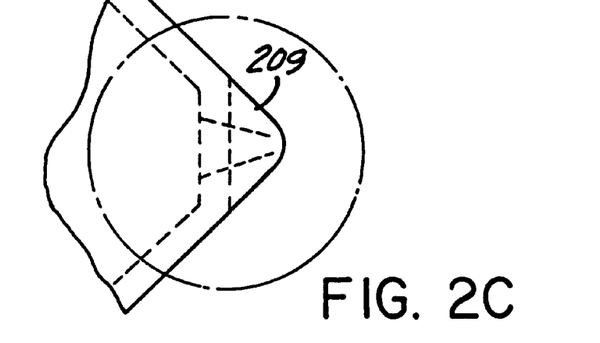
FIG. 2c is an enlarged top plan view of the container of FIG. 2.

FIG. 2 shows an isometric drawing of a rectangular embodiment of the instant invention which is of rectangular configuration with one flattened corner 201. FIGS. 2A–2C show a rim 202 above flatted corner 201 which continues beyond the flat to create a tab, in which is formed a semi-pyramidal beaklike hollow stress concentrator protrusion 208 said tab and protrusion traversed by a fault line 209 parallel to the flattened corner 201. The protrusion intersects the narrow wall created by the flattened corner 201. The rectangular hollow product containment member 203 with flatted corner 201 has a rim 202 to which is sealed a lid 204.

Figure 2D:
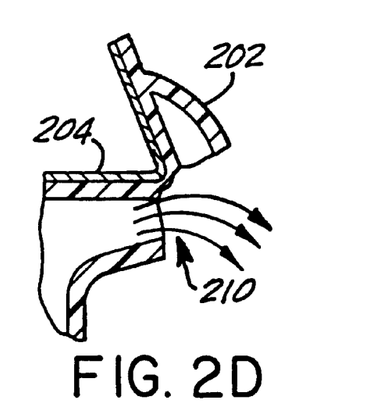
FIG. 2d is an enlarged sectional view take along line 2b—2b of FIG. 2 showing a ruptured fault line.

FIG. 2D shows the stress concentrator protrusion in bent back position having ruptured said fault line 209 creating product outlet 210.

Figure 3A:
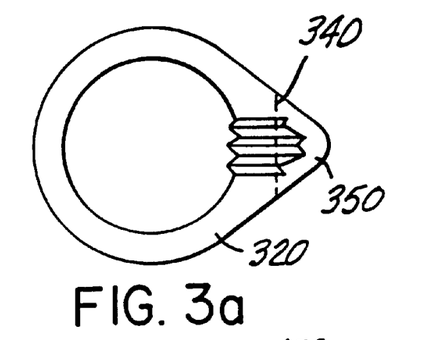
FIGS. 3a and 3b show a top plan view and a side plan view, respectively, of a container according to another embodiment of the present invention.
Figure 3B:
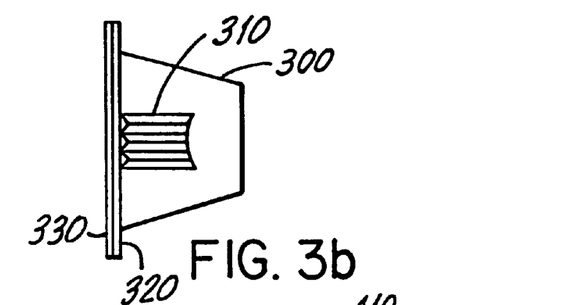

In FIGS. 3A and 3B, there are shown a typical container according to another embodiment of the present invention. The container comprises a containment member 300 with rim 320 and tab 350 extending therefrom and at least one channel shaped protrusion 310 formed into the rim 320. A thin plastic membrane like lid 330 is sealed to the top surface of the rim 320 thereby sealing the container. The channel shaped protrusion 310 is formed in the wall of the containment member 300 and curves into the underside of the tab 350. A fault line 340 traverses the protrusion 310.

Figure 4A:
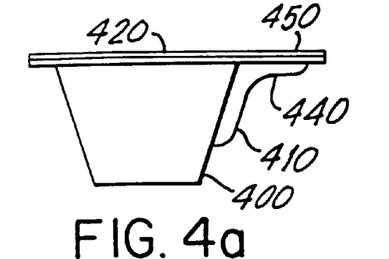
FIGS. 4a, 4b, and 4c are, respectively, a side plan view, an enlarged sectional top plan view, and an enlarged sectional view depicting an aperture created upon rupturing the fault line of the container of FIGS. 4a and 4b.
Figure 4B:
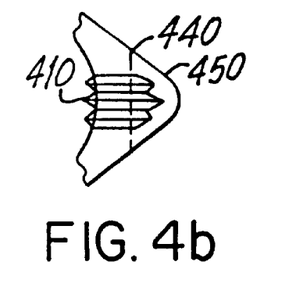
Figure 4C:
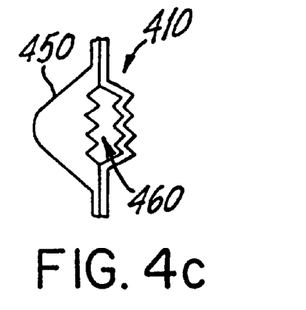

FIGS. 4A and 4B show one embodiment of the present invention utilizing at least one curvilinear channel shaped protrusion 410 formed into the wall of a containment member 400 extending upward and curving into the tab 450. As shown in FIG. 4B, a substantially straight fault line 440 traverse the protrusion member 410. When the tab 450 is bent back, the fault line 440 ruptures, thereby creating an aperture 460. As shown in FIG. 4C, the aperture 460 is particularly suited for high viscosity products and/or particulates, such as salad dressing, ointments, sour cream, and yogurt. Such a configuration would work with barrier and high strength materials such as NY-PET-EVOH-PVC-PP, and various coextrusions of such materials as well as HIPS.

In another version a semi-pyramidal beak shaped protrusion with a peaked cross section traversed by a fault line may be used with a variety of materials ranging from HIPS to the toughest coextrusion of barrier films. It is similar in configuration to one half the stress concentrators claimed on U.S. Pat. No. 4,493,574 and will dispense a broad range of products over almost all viscosity ranges.

Figure 5A:
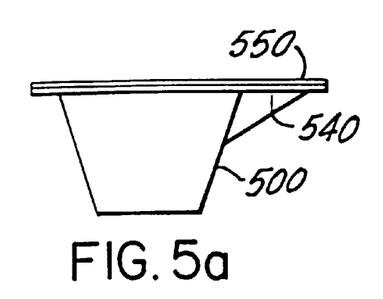
FIGS. 5a, 5b, and 5c are, respectively, a side plan view, an enlarged sectional top plan view, and an enlarged sectional view depicting an aperture created upon rupturing the fault line of FIGS. 5a and 5b.
Figure 5B:
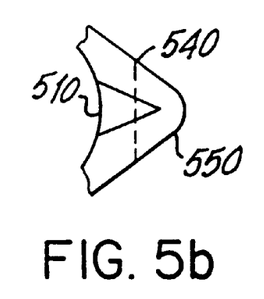
Figure 5C:
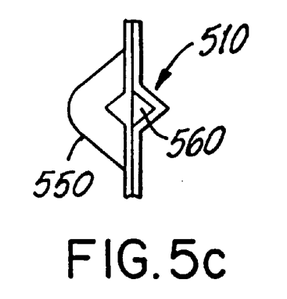

FIG. 5a shows a container according to this embodiment of the present invention having a containment member 500 with a semi-pyramidal beak shaped protrusion 510. As shown in FIG. 5B, the protrusion 510 extends into a tab 550 and is traversed by a fault line 540. In operation, the tab 550 is bent back, thereby rupturing the fault line 540. As shown in FIG. 5C, rupturing the fault line 540 creates an aperture 560 that is particularly suited for dispensing high viscosity products without particulates, such as suntan lotion, syrup, and the like. As noted, such a configuration may be made with many high strength and barrier materials such as NY-PET-PVC-EVOH.

In yet another version a micro-groove with a fault line traversing its locus may be used. The micro-groove may be defined as a groove in the top surface of the tab extension to a depth of less than the thickness of the plastic material of said tab extension. For example an 8 mil (0.008") thick tab extension would have a groove depth of no more than 0.008" although in practice 0.005" might be preferable. These minute micro-grooves are effective channels for the flow of low viscosity products such as coffee cream, alcohol, water, solvents, etc. where flow control is necessary or preferable.

These small grooves furthermore create spill free and drip resistant outlets. In the subject packaging of this application flow rates are adjustable by even slight variation of the finger pressure applied. It will be seen that if a micro-groove or even deeper groove is formed into a tab and terminates before crossing the locus of the fault line and an unsealed area extends from the end of the said grooves for a short distance traversing the fault line locus before becoming sealed by the peripheral seal surrounding the entire package then a free flow can be achieved up to the flat unsealed outlet means yielding a valve feature for the outlet as in the initial valved outlet means described below.

It should be noted that the micro-grooves can, in some cases, be made in the tab extension upper surface with no protrusion on its underside. It will be further realized that if a 10 mil (0.010") groove depth were desired in a 10 mil thick tab extension then obviously a protrusion would have to appear on its underside. It would however, have no function as a stress concentrator.

Figure 6A:
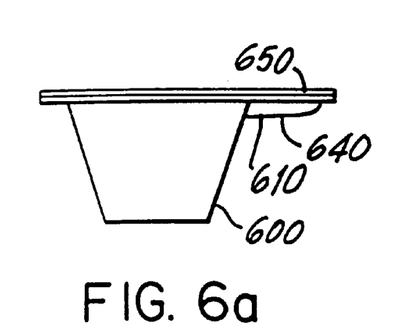
FIGS. 6a, 6b, and 6c are, respectively, a side plan view, an enlarged sectional top plan view, and an enlarged sectional view depicting an aperture created upon rupturing the fault line of FIGS. 6a and 6b.
Figure 6B:
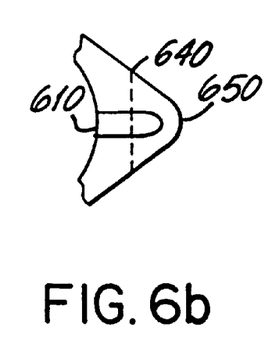
Figure 6C:
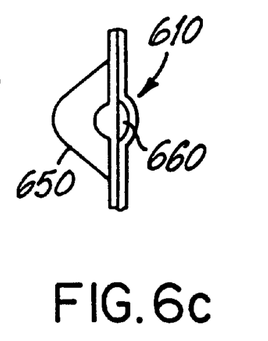

FIG. 6a shows an embodiment of the present invention having one such relatively thin micro groove protrusion 610 formed in a containment member 600. In micro groove protrusion 610 it is traversed by a fault line 640. The micro groove protrusion 610 extends into a tab 650, which when bent back, causes the fault line 640 to rupture, thereby creating an aperture 660. The aperture 660, shown in FIG. 6C, is particularly suited for low viscosity products, such as coffee creamers. It is to be appreciated that such a configuration may be made with HIPS and HIPS with laminates through which laminate fault line 640 is cut so that only the HIP is required to rupture when the tab 650 is bent back.

In one embodiment of the present invention, it was unexpectedly discovered that for products such as coffee cream etc., the outlet forming means about to be described will act as its own valve which will only dispense the product under pressure and then close to prevent even the slightest spill or drip.

The flat rim extension or tab of a typical bucket shaped coffee creamer takes an approximately triangular configuration and is traversed by a fault line or cut on its underside parallel to a line tangent to the circular creamer body and its entire upper surface is sealed to a lid. Instead of sealing the entire upper tab surface to the lid however a tongue shaped area of the surface of the tab is left unsealed and extends within its peripheral seals from the bucket outward, traversing and carrying slightly beyond the locus of the fault line.

There are certain frangible plastics that, even when flat, will rupture along a simple fault line when bent. HIPS is the one generally used in coffee creamers.

In this embodiment such a plastic must be used. As will be realized when the tab is bent up and the plastic ruptures, the end of the unsealed tongue shaped area between the lid and the bucket rim will be exposed to the outside with the surfaces in the unsealed tongue shaped area between the lid and the tab remaining in contact with each other.

It will be seen that even a low viscosity product like cream will not likely drip or leak from it. When moderate finger pressure is applied to the unit while the rim extension is pointed downward, however, the lid plastic and in fact the rim extension both arc slightly away from each other creating a flattened football shaped outlet aperture which acts as an effective nozzle through which a coherent stream of product may be dispensed.

It was further unexpectedly discovered that when very thin gauge film (approx.1–2 mils) is used for the lids of the subject dispensing packages, that after sealing it doesn't remain flat and taut over the container opening like a drum skin. It has a range of flexibility which permits it to take a shallow arched or domed shape when even slight finger pressure is applied to the sealed container. It will be seen that in the case of the unsealed tongue shaped area encompassed by the container seal, that the same internal pressure inflates and slightly arches the lid material over the unsealed tongue area. It is this "give" in the very thin gauge material "as sealed" structure that makes for efficient flow of low viscosity product through the outlet of the unsealed area at the locus of the ruptured fault line. It will also be seen that when said external light finger pressure is released that the two wet surfaces, the wet underside of the lid film and the wet upper surface of tab extension come together and will be held together by capillary action and valve off the outlet to prevent dripping.

When a straight fault line is used in conjunction with the unsealed area it will create an outlet and path for contained low viscosity products when the tab is bent up. However, if the rupture at the fault line is irregular or not a clean break it can partially obstruct the stream of product being dispensed. If the tab extension is too rigid, the tab portion which is broken off and the end of the tab portion remaining create a straight line outlet which has to be spread apart into the flattened football shaped outlet aperture. While this will dispense the product under adequate pressure the pressure needed may vary and thus the product stream may vary from package to package. It was then that it was discovered that a curved fault line eliminated this difficulty. When the curved fault line with its convex side pointed away from the container is bent up, the fault line ruptures along its curve and we find that the tab which breaks away is concave at its base, creating an arch over the outlet, eliminating the compression of the doubled lid stock at the outlet.

In a further unexpected discovery it was found that a score line having two straight end sections between which there is an arcuate section with its convex side extending outward from the container, which arcuate section has a chordal length approximately equal to the width of the unsealed tongue shaped area which it traverses, functioned ideally.

The discovery of the curved or partially curved fault line significantly benefits the creation of the outlet in the subject dispensing packages without the need for protrusions or micro-grooves or formations for stress concentrating and outlet formation as claimed in other versions described herein but instead simply an unsealed tongue area traversing the fault line locus.

In the case of these various curved versions of fault lines, it was discovered that on opening, the broken away tab end has a arcuate base and instead of straight line outlet we get a arched opening between the lid and the tab since the remaining tab which is the lower side of the outlet remains flat while the broken away tab portion when bent up at approximately 90° has a neat little arch straddling the unsealed outlet end. Furthermore, since the little tab piece is adhered to the lid stock, it tends to raise it up and away from the remaining rim which constitutes the lower side of the outlet. These embodiments will now be described in greater detail with reference to FIGS. 7–12.

Figure 7A:
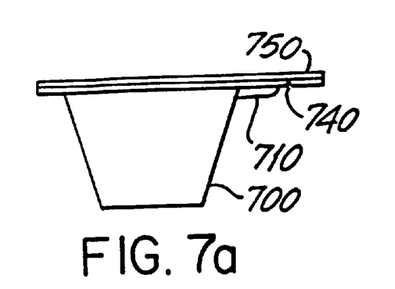
FIGS. 7a, 7b, and 7c are, respectively, a side plan view, an enlarged sectional top plan view, and an enlarged sectional view depicting an aperture created upon rupturing the fault line of FIGS. 7a and 7b.
Figure 7B:
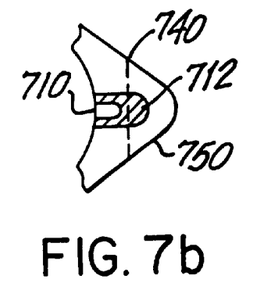
Figure 7C:
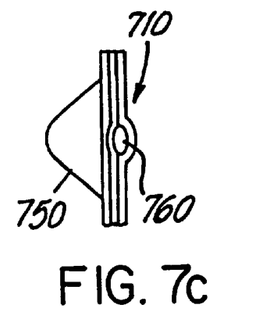

In FIG. 7A–C, another embodiment of the present invention is shown having a containment member 700 and the micro groove protrusion 710 formed on the underside tab 750. As can be seen in FIG. 7A, the micro groove protrusion 710 is not traversed by a fault line. Rather, a fault line 740 traverses an unsealed tongue area 712. Like previous embodiments, bending back the tab 750 causes the fault line 740 to rupture. Consequently, an unsealed area 760 is exposed, so that slight pressure on the containment member 700 cause the contains therein to be expelled. It is to be appreciated that this configuration provides a valve like action and prevents leakage. This configuration may be made with HIPS and HIPS with laminates though which laminate the fault line 740 is cut so that only the HIPS is required to rupture.

Figure 8A:
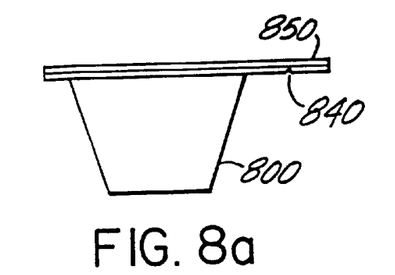
FIGS. 8a, 8b, and 8c are, respectively, a side plan view, an enlarged sectional top plan view, and an enlarged sectional view depicting an aperture created upon rupturing the fault line of FIGS. 8a and 8b.
Figure 8B:
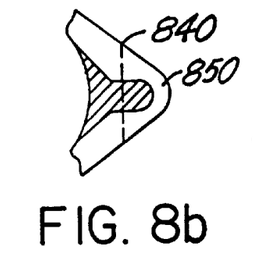
Figure 8C:
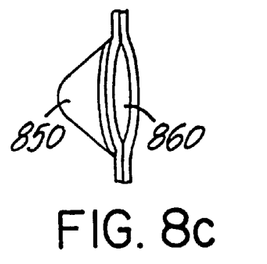

FIGS. 8A–C another embodiment of the present invention similar to those described in FIGS. 4–7, except the embodiment of FIG. 8 does not have a groove or protrusion member. Instead, the container of FIG. 8 is provided with an unsealed tongue shaped area 812 that extends into a tab 850. A fault line 840 traverses the unsealed tongue area shaped 812. When the fault line 840 is ruptured, the rim seal remains surrounding the unsealed area. Upon applying pressure to the containment member 800, an unsealed outlet opening 860 shown in FIG. 8C, is created. Like the previous embodiment, this configuration may be made with HIPS and HIPS with laminates.

In another version of the outlet forming means, there is no formation made in the tab but it will still have a fault line traversing its underside. In this case a hollow formation will be made in the lid which will stand clear of the tab although sealed all around its periphery to act as clearance for the fluid to be dispensed, it may be narrow or not, so long as a portion of it traverses the fault line locus and extends back over the product containment member to provide a channel to the outlet formed when the tab is bent up.

Figure 9A:
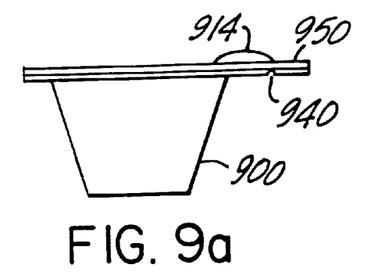
FIGS. 9a, 9b, and 9c are, respectively, a side plan view, an enlarged sectional top plan view, and an enlarged sectional view depicting an aperture created upon rupturing the fault line of FIGS. 9a and 9b.
Figure 9B:
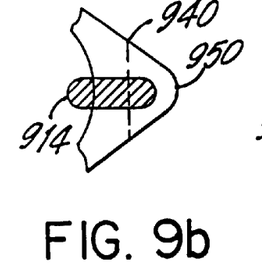
Figure 9C:
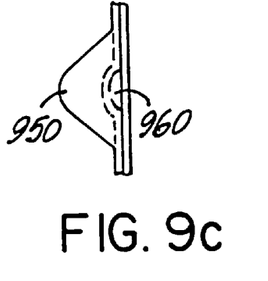

FIGS. 9A–C shows such another version having a containment member 900 and no protrusion. As shown, the embodiment includes a raised formation 914 in the lid. The raised formation extends from above the containment member 900 and into a tab 950. As shown in FIGS. 9A and 9B, the fault line 940 traverses the tab 950 under the raised the formation 914. As shown in FIG. 9C, rupturing the fault line 940 permits the raised formation 914 to serve as a channel from the containment member 900 to an opening 960 thus formed at the fault line 940. It is to be understood that the shape of the fault line 940 may be relatively straight, curvilinear, or a combination.

Figure 10A:
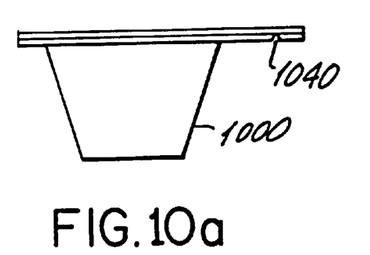
FIGS. 10a, 10b, and 10c are, respectively, a side plan view, an enlarged sectional top plan view, and an enlarged sectional view depicting an aperture created upon rupturing the fault line of FIGS. 10a and 10b.
Figure 10B:
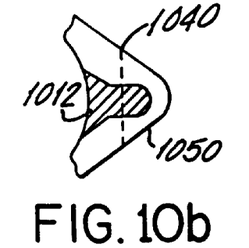
Figure 10C:
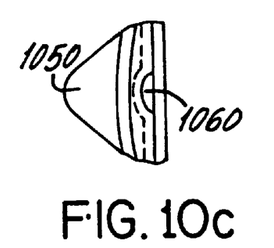

FIGS. 10A–C shows a embodiment similar to FIGS. 8A–C and that contains an unsealed tongue area 1012 extending into a tab 1015. Unlike the embodiment of FIGS. 8A–C, however, the unsealed tongue area 1012 is traversed by a curvilinear fault line 1040 comprising two straight end sections and a center section arched in a outward direction from the containment member 1000.

Figure 11A:
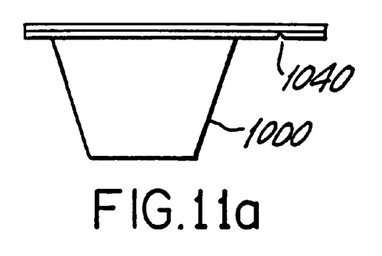
FIGS. 11a, 11b, and 11c are, respectively, a side plan view, an enlarged sectional top plan view, and an enlarged sectional view depicting an aperture created upon rupturing the fault line of FIGS. 11a and 11b.
Figure 11B:
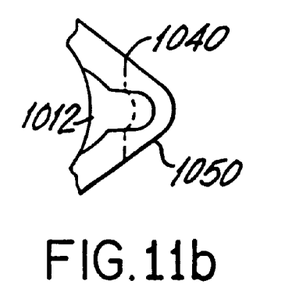
Figure 11C:
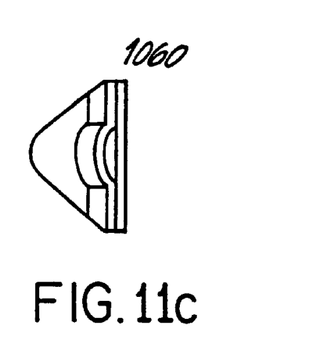

FIGS. 11A–C shows the same arrangement as in FIGS. 10A–C, except that the cross hatching of the unsealed tongue portion 1012 has been removed for clarity.

Figure 12A:
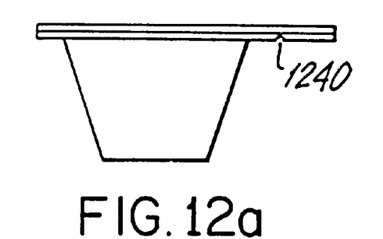
FIGS. 12a, 12b, and 12c are, respectively, a side plan view, an enlarged sectional top plan view, and an enlarged sectional view depicting an aperture created upon rupturing the fault line of FIGS. 12a and 12b.
Figure 12B:
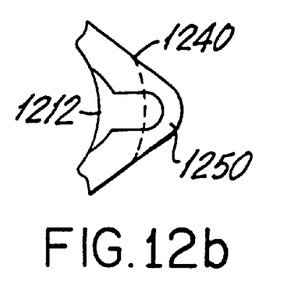
Figure 12C:
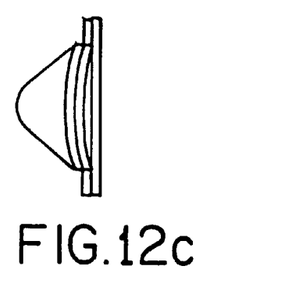

FIGS. 12A–C show another embodiment of the present invention wherein the fault line 1240 is fully curved. As can best be seen in FIG. 12B the fully curved fault 1240 traverses an unsealed tongue shaped area 1212.

It is to be understood that various other combinations of the protrusions, sealing patterns, and fault lines in described herein, particularly those of FIGS. 4–12, may be combined for beneficial results.

The system of creating outlet means in the subject packages by simply bending the tab upward has variations other than those embodiments mentioned above. These methods in general require a hollow formation, groove or protrusion formed in the tab extending from the underside of the tab and intersecting the hollow product containing portion wall which is traversed by fault line. These protrusions may take a variety of configurations and some are particularly advantageous when utilizing tough barrier non-frangible thermoplastic and/or combinations thereof in laminates or coextrusion and/or for handling viscous products or products containing particulates, a variety of stress-concentrating formations may be formed in the rim extension tab of a thermoformed dispenser package.

In one version a single or multiple channel shaped protrusion formation of similar cross sections described in applicants U.S. Pat. No. 5,395,031 varying in the fact that it takes a curvilinear shape in its transition from the underside of the tab to a continuation of said formation traveling down the wall of the product containing portion of the package. This makes for a particularly strong formation within itself capable of rupturing thin gauge tough materials and laminates or coextrusions thereof. This version of the outlet forming means is particularly effective for various soft cheeses, pastes and/or products with particulates and has the further capability of dispensing the product in an attractive ridged ribbon in its multiple channel version. It will be seen that these multiple channel shaped protrusions may be in the case of rectangular packages be formed in a tab extending from one entire end of the package as well as from a flattened corner. Such embodiments will now be described in greater detail with reference to FIGS. 13–16.

Figure 13:
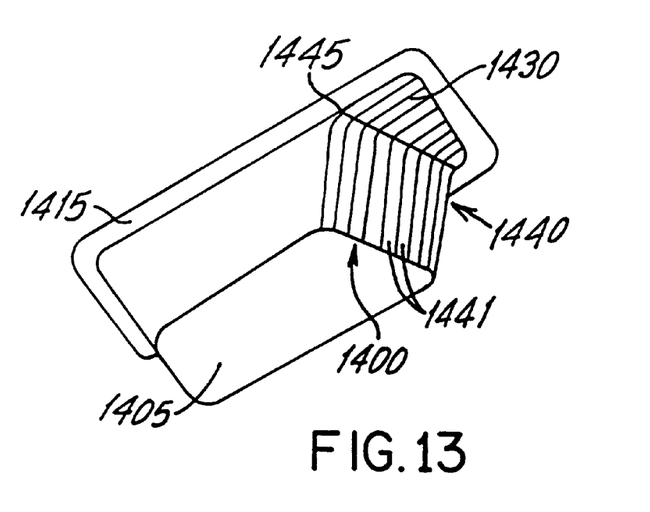
FIG. 13 is a partially low view of a container according to another embodiment of the present invention.

FIG. 13 shows an underside isometric drawing of a generally rectangular shaped package with a flattened corner 1400 where a multiple channel aperture forming means 1440 is formed into a flattened corner 1400 where the width of the aperture forming means 1440 is so great that the flattened corner 1400 becomes the end of the hollow product container member 1405. The multi-channel or multi-grooved curvilinear aperture forming means 1440 is shown having the cross section shown in FIG. 14C with pointed peaks 1443 and pointed troughs 1442A with a fault line traversing the curved transitional portion of the aperture forming means 1440 which when ruptured will create an extra large outlet. The aperture forming means 1440 is formed in rim 1415 to create an enlarged corner tab 1430.

Figure 14A:
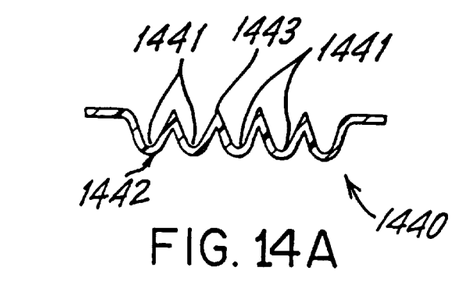
FIGS. 14a–14f are various cross sectional views of protrusion members according to the present invention.
Figure 14B:
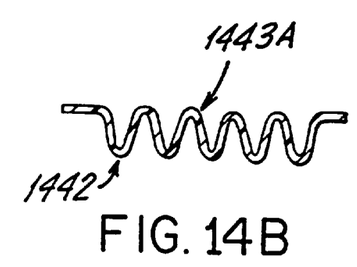
Figure 14C:
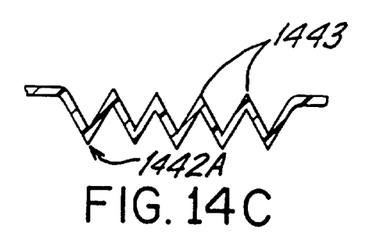

FIGS. 14A through 14F illustrate various alternatives of the aperture forming means 1440 of FIG. 13. More specifically, FIGS. 14A through 14F illustrate various cross sectional depictions of the aperture forming means 1440 taken along the fault line. As shown in FIG. 14A, the aperture forming means 1440 has multiple channel protrusions 1441 that may have rounded bottoms 1442 in order to prevent inadvertent rupture of the members 1441. The aperture forming means protrusions 1441 may have sharp crests or peaks 1443 as shown in FIG. 14A, or curved crests 1443A, as shown in FIG. 14B. Alternatively, both the crests 1443 and the bottoms 1442A may be sharp, as shown in FIG. 14C.

Figure 14D:
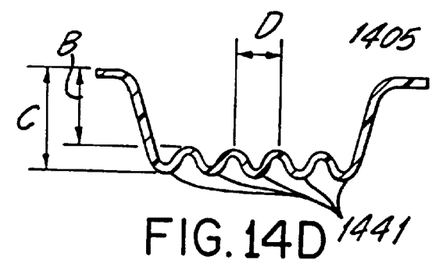

As shown in FIG. 14D, the aperture forming means protrusion 1441 may extend a distance B from the wall flattened corner 1440 of the container 1400. Alternatively, the aperture forming means protrusions 1441 may be recessed a distance B from the wall of the container member 1405. Furthermore, the distance between protrusion members D, as well as the depth of the protrusion members C, may vary depending upon the material used, its thickness, and the product to be dispensed.

Figure 14E:
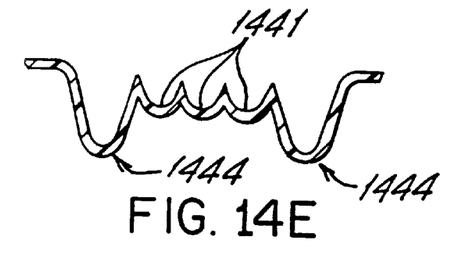
Figure 14F:
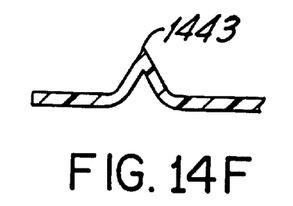
Figure 15A:
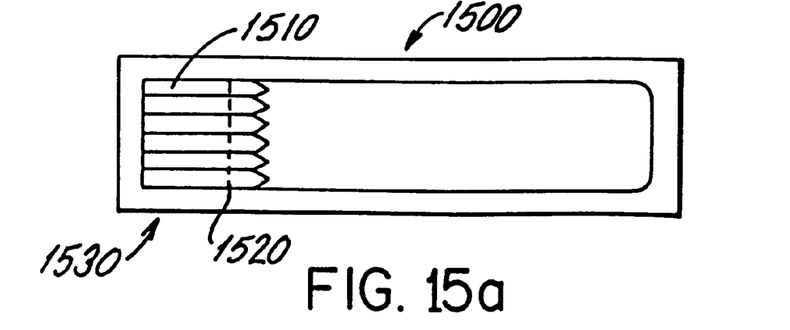
FIG. 15a is a top plan view of a container according to another embodiment of the present invention.
Figure 15B:
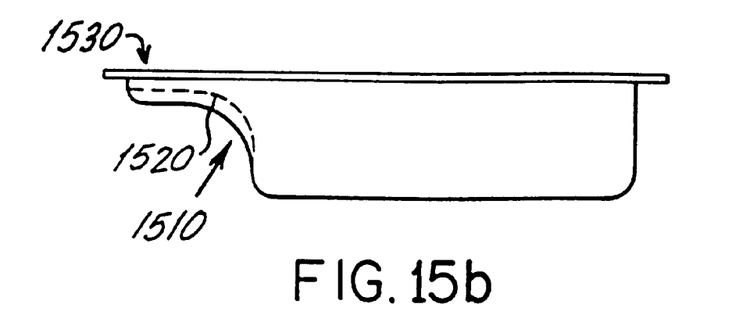
Figure 15C:
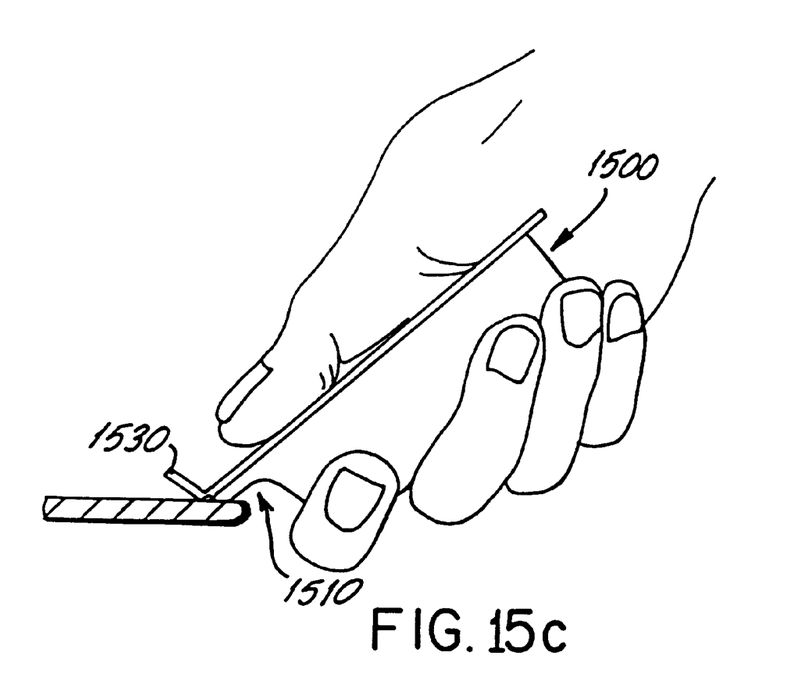
FIG. 15c is a side plan view of the container of FIGS. 15a and 15b showing the container in use.

In an alternative embodiment, as shown in FIG. 14E, guard protrusion members 1444 are larger than and extend further than the remaining protrusions 1441, thereby providing more support and greater resistance to inadvertent or even intended opening. In yet another embodiment, shown in FIG. 14F, an aperture forming means 1440 comprises a single "V" shaped channel. It is to be understood that many combinations of the aperture forming means and protrusion members herein discussed may be employed in combination with any sized or shaped container and with various plastic materials of various thicknesses.

turning now to FIGS. 15a and 15b, another embodiment of the present invention is shown. Specifically, a container 1500 is generally rectangular shaped and has a curvilinear stress concentrator aperture forming means 1510. Although the aperture forming means 1510 is similar to that depicted in FIG. 13, it should be noted that in the present embodiment, the aperture forming means 1510 is formed into an end rim extension 1530 curving down the front of the containment member of the container 1500, rather than in a flattened corner. As shown, a fault line 1520 traverses the aperture forming means 1510. FIG. 15C depicts the container 1500 in use. As can be seen, the fault line 1520 has been ruptured by bending back the end 1530. Because the container 1500 may be made narrow, it is easily grasped in one hand for dispensing the contents thereof.

Figure 16A:
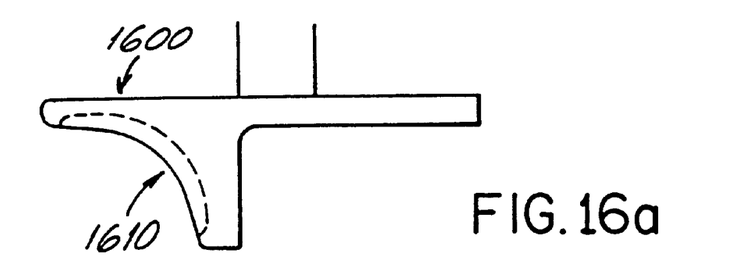
FIG. 16a is a side plan view a male forming punch for forming the container shown in FIGS. 15a–15c.
Figure 16B:
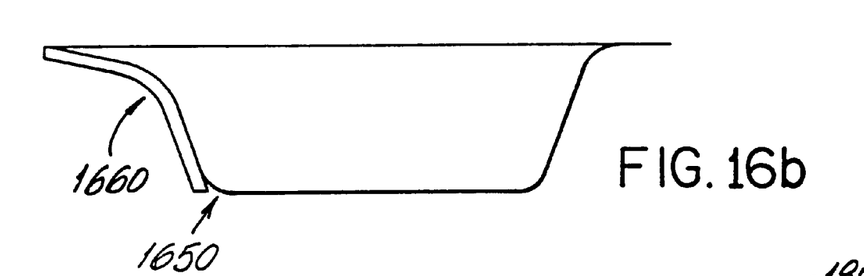
FIG. 16b is a side plan view of a female forming punch for cooperating with the male forming punch of FIG. 16a for forming the container of FIGS. 15a–15c.

FIGS. 16a and 16b show one mechanism for forming the container of FIGS. 15A–C. FIG. 16A shows a male forming punch 1600 having a curvilinear front surface 1610. The curvilinear front surface 1610 includes a series of grooves and ridges. Similarly, a mating female forming die 1650 has a curvilinear front surface 1660 having a series of grooves and ridges that are complimentary to those of in the front surface 1610 of the male forming punch 1600. In operation, the material from which a container is to be formed is placed between the male punch 1600 and the female punch 1650. Because the two front surfaces 1610, 1660 are complimentary, they meet in mating engagement, thereby deforming the material into a curvilinear stress concentrator. It is to be understood that any of the stress concentrator aperture forming means described with reference to FIGS. 14A–F may be obtained by so configuring the front surfaces 1610, 1660.

In U.S. Pat. No. 5,395,031 titled Stress Concentrator Aperture-Forming Means for Sealed Containers and Packages the following is described and claimed: "a substantially flat, relatively stiff sheet member formed from a relatively thin, relatively flexible material . . . having a generally planar channel shaped configuration . . . . "

In developing these new packages it was unexpectedly discovered that a curvilinear (not "generally planar") configuration for the general shape of the aperture forming means worked extremely well particularly when applied in the shape of a shallow inverted: "L" or "hockey stick" to a container with a rim or tab extension. the aperture forming means is formed into and beneath the rim or tab extension of the container wall and traveling toward the container wall and curving downward and formed into said wall. It was found that the shape and size of the aperture could be varied by the location of the traversing fault line and it was further found that the structure of the container wall was considerably strengthened and that wider than expected apertures could be made. It will be seen that a curvilinear formation made independent of a container may be adhesively or sealing attached to various matchingly curved surfaces of containers or other structures.

Figure 17:
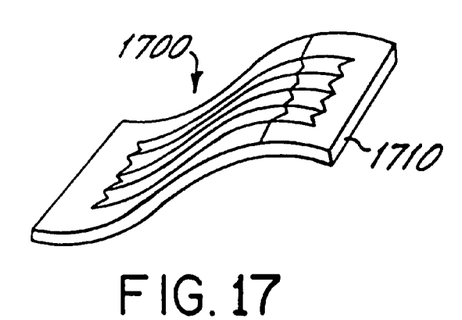
FIG. 17 is a partially elevated perspective view of an independent curvilinear aperture forming means for mounting on a curved surface.

FIG. 17 shows such an embodiment of the present invention. Specifically, FIG. 17 shows an independent curvilinear expandable aperture forming means 1700. Like the aperture forming means described above, a fault line 1720 traverses the aperture forming means 1700. The aperture forming means 1700 is formed in a curvilinear base 1710 having virtually any shape, thereby allowing the aperture forming means 1700 to be mounted on any matching curved surface. As noted above, the aperture forming means 1700 is mounted over an opening in a container surface in any number of ways, including placing an adhesive around the perimeter of the base 1710.

Figure 18:
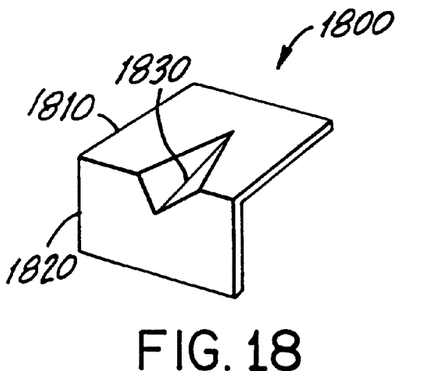
FIG. 18 is a side perspective view of an independent semi-pyramidal beak like stress concentrator.

FIG. 18 shows an isometric view of a semi-pyramidal beak like stress concentrator 1800. Although the stress concentrator 1800 may be formed into surfaces having many shapes, the stress concentrator 1800 of the present embodiment depicts is depicted as being formed in two relatively flat walls 1810, 1820. The stress concentrator 1800 is hollow and open to the rear (not shown) so that it may be affixed to a containment member, thereby creating a container similar to that shown in FIGS. 5a–c. Like the various embodiment described herein, the semi-pyramidal beak like stress concentrator member 1800 is traversed by a fault line 1830. It is to be understood that like the embodiment shown in FIG. 17, the semi-pyramidal beak like protrusion may be formed in a curvilinear base as well.

It will therefore also be seen that some of the easy opening features may be formed independently and sealed or adhered to inner or outer surfaces of many packages such as bags, milk containers, pouches pillow packages (sachets), etc. to make for very efficient low cost dispensing packages or squeeze bags. These squeeze bag type packages could dispense food pastes such as pet food, etc. cremes, grease, yogurt, certain types of dough, cake frosting and could be made of everything from treated, coated paperboard, plastic films, foils, laminates or coextrusion of these materials.

Figure 19:
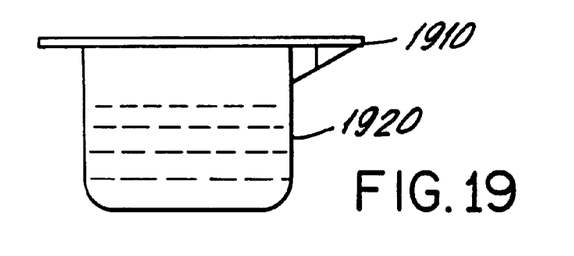
FIG. 19 is a side plan view of another embodiment of the present invention showing a non-rigid or soft containment member.

It should be understood that while the packages of the instant application are shown with or appear to have a fairly rigid structure for the containment member, in thermoforming it is possible to create a relatively stiff rim on a soft bottom or containment member. FIG. 19 shows such a structure having a relatively stiff rim 1910 and a soft containment member 1920. It should be also understood that this structure can be capable of standing upright and in fact resist tipping over somewhat in the manner of bean bag.

I claim:

1. In a cup or tub for squeezably dispensing products, a thin walled container thermoformed from a relatively thin flat plastic film comprising a hollow containment formation having a base parallel to an upper flat rim to which a thin cover member is sealingly attached in a sealing pattern, said sealing rim encompassing said containment formation with at least a portion of said sealing rim extending outwardly from said hollow containment formation an amount adequate to permit it to function as a tab, said extending tab portion having fault line on its underside traversing said tab at a right angle to a centerline extending outwardly from said hollow containment formation which when said tab portion is upwardly bent causes said tab to rupture at said fault line causing the outer tab portion to break away from the remaining tab portion while remaining sealed to the thin cover member which is also upwardly bent to create an outlet passage for flowable material between said remaining tab portion and said thin cover.

2. The container of claim 1 where said hollow containment formation is of a generally upstanding frusto-conical bucket shape.

3. The container of claim 2 where said sealing pattern creates an unsealed tongue shaped area between said rim at its tab portion and said thin cover, said unsealed tongue shaped area encompassed by the lid seal around the periphery of the tab portion and its continuation about the rim, said unsealed area extending from the hollow containment formation outward traversing said tab and said fault line on said tab's underside and ending at the peripheral lid seal.

4. The container of claim 3 where said fault line is straight.

5. The container of claim 4 where the upper surface of said unsealed tongue shaped area of said tab portion has a groove extending from said containment formation to a point terminating a short distance before reaching the fault line on said tab's underside to create a valved outlet when said tab portion is upwardly bent to rupture said fault line.

6. The container of claim 3 where said fault line is curved with its convex side facing away from said containment formation.

7. The container of claim 6 where the upper surface of said unsealed tongue shaped area of said tab portion has a groove extending from said containment formation to a point terminating a short distance before reaching the fault line on said tab's underside to create a valved outlet when said tab portion is upwardly bent to rupture said fault line.

8. The container of claim 3 where said fault line has a straight section at each end and a curved section between said straight sections said curved section traversing said unsealed tongue shaped area, and having its convex side facing away from said containment formation.

9. The container of claim 8 where the upper surface of said unsealed tongue shaped area of said tab portion has a micro-groove extending from said containment formation to a point terminating a short distance before reaching the fault line on said tab's underside to create a valved outlet when said tab portion is upwardly bent to rupture said fault line.

10. The container of claim 3 where the upper surface of said unsealed tongue shaped area of said tab portion has a groove extending from said containment formation to a point terminating a short distance before reaching the fault line on said tab's underside to create a valved outlet when said tab portion is upwardly bent to rupture said fault line.

11. The container of claim 2 where said tab portion has a groove on its upper side, said groove extending outwardly from said containment formation traversing said tab and said fault line on said tab's underside at a right angle and ending just beyond said fault line to create a channel outlet for a low viscosity product when said tab portion is upwardly bent to rupture said fault line.

12. The container of claim 1 where said sealing pattern creates an unsealed tongue shaped area between said rim at its tab portion and said thin cover, said unsealed tongue shaped area encompassed by the lid seal around the periphery of the tab portion and its continuation about the rim, said unsealed area extending from the hollow containment formation outward traversing said tab and said fault line on said tab's underside and ending at the peripheral lid seal.

13. The container of claim 12 where said fault line is straight.

14. The container of claim 12 where said fault line is curved with its convex side facing away from said containment formation.

15. The container of claim 12 where said fault line has a straight section at each end and a curved section between said straight sections said curved section traversing said unsealed tongue shaped area, and having its convex side facing away from said containment formation.

16. The container of claim 12 where the upper surface of said unsealed tongue shaped area of said tab portion has a groove extending from said containment formation to a point terminating a short distance before reaching the fault line on said tab's underside to create a valved outlet when said tab portion is upwardly bent to rupture said fault line.

17. The container of claim 1 where said extending tab has a stress concentrator aperture forming means comprising at least one thin wall channel shaped protrusion projecting from its lower surface which is traversed by the fault line on the underside of said tab, said at least one protrusion extending outwardly from an intersection with the sidewall of said hollow containment formation to just beyond the traversing fault line said at least one protrusion being encompassed by the lid seal around the periphery of the extending tab portion and its continuation around the rim, said at least one protrusion curving down the side wall of said hollow containment formation to act as a wall strengthening gusset member.

18. The container of claim 1 where said tab portion has a groove on its upper side, said groove extending outwardly from said containment formation traversing said tab and said fault line on said tab's underside at a right angle and ending just beyond said fault line to create a channel outlet for a low viscosity product when said tab portion is upwardly bent to rupture said fault line.

19. The container of claim 1 where said tab portion has generally a semi-pyramidal beaklike hollow stress concentrating protrusion extending downward from said tab and intersecting the sidewall of said containment formation with its large end, said protrusion being traversed by said fault line on said tab's underside, said protrusion of such configuration as to act as a strengthening gusset between said tab and the wall of said containment formation.

20. The container of claim 1 where said hollow containment member has a generally rectangular cross section with one corner flattened, said tab extending over said flattened corner.

21. In a cup or tub for squeezably dispensing products, a thin walled container thermoformed from a relatively thin flat plastic film comprising a non-rigid hollow containment formation with an upper flat relatively stiff rim to which a thin cover member is sealingly attached in a sealing pattern, said sealing rim encompassing said containment formation with at least a portion of said sealing rim extending outwardly from said hollow containment formation an amount adequate to permit it to function as a tab, said extending tab portion having fault line on its underside traversing said tab at a right angle to a centerline extending outwardly from said hollow containment formation which when said tab portion is upwardly bent causes said tab to rupture at said fault line causing the outer tab portion to break away from the remaining tab portion while remaining sealed to the thin cover member which is also upwardly bent to create an outlet passage for flowable material between said remaining tab portion and said thin cover.

* * * * *